Dec. 23, 1958 J. BUCHLER 2,865,445
EVAPORATOR
Filed Oct. 14, 1954 2 Sheets-Sheet 1
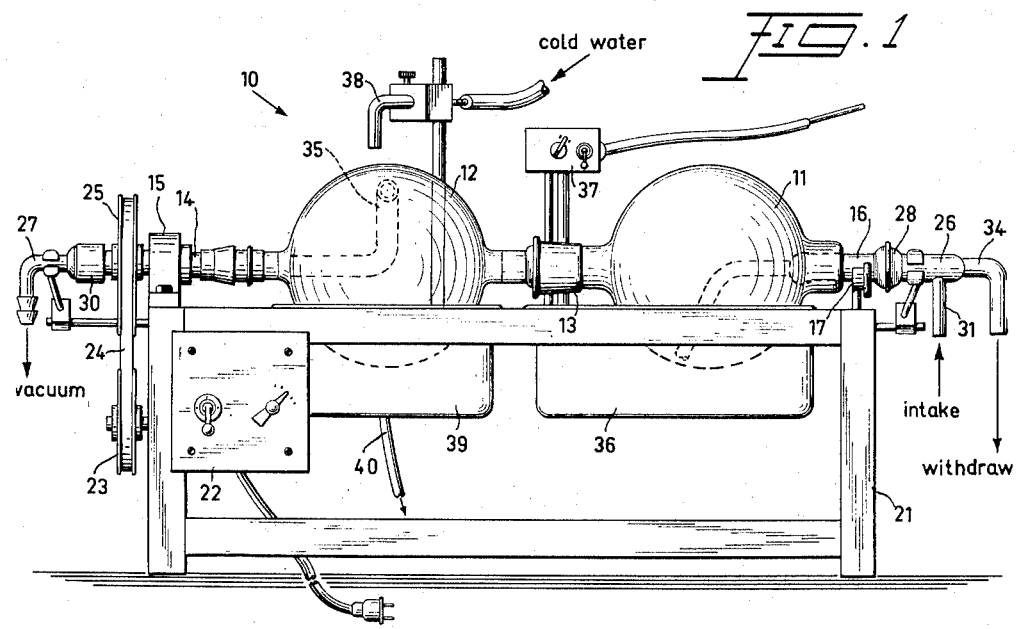
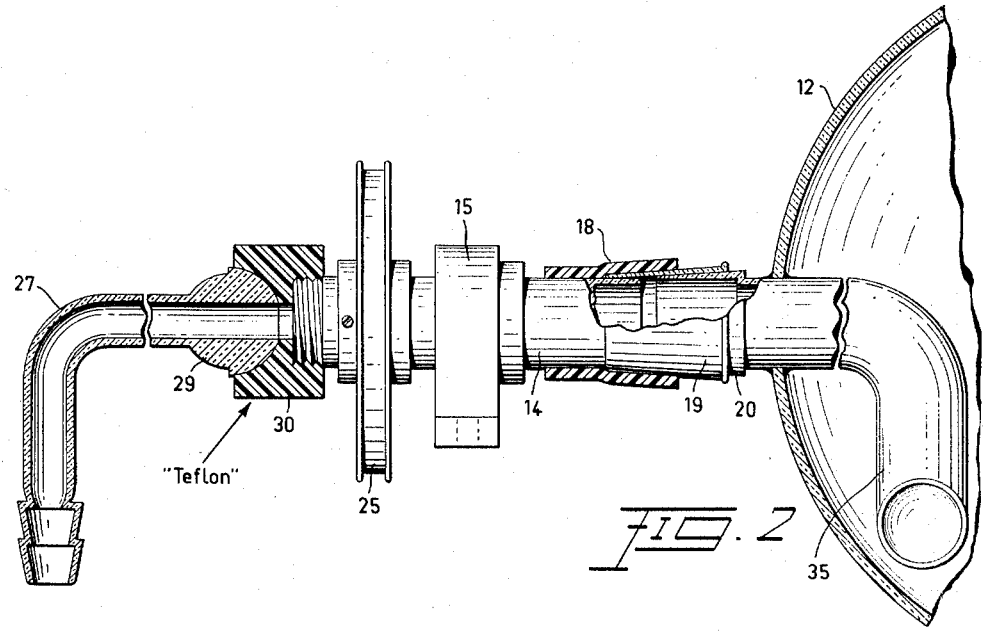
INVENTOR:
JOSEPH BUCHLER
BY
AGENT Dec. 23, 1958  J. BUCHLER  2,865,445
EVAPORATOR
Filed Oct. 14, 1954  2 Sheets-Sheet 2
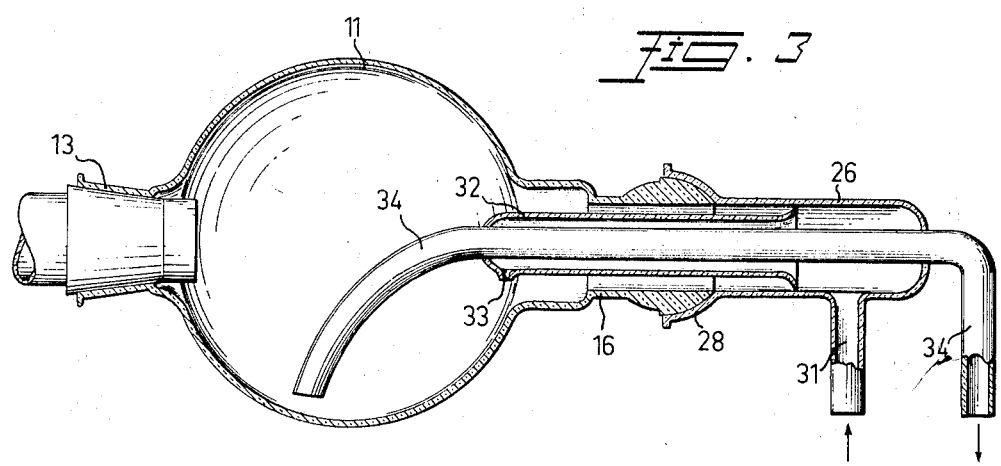
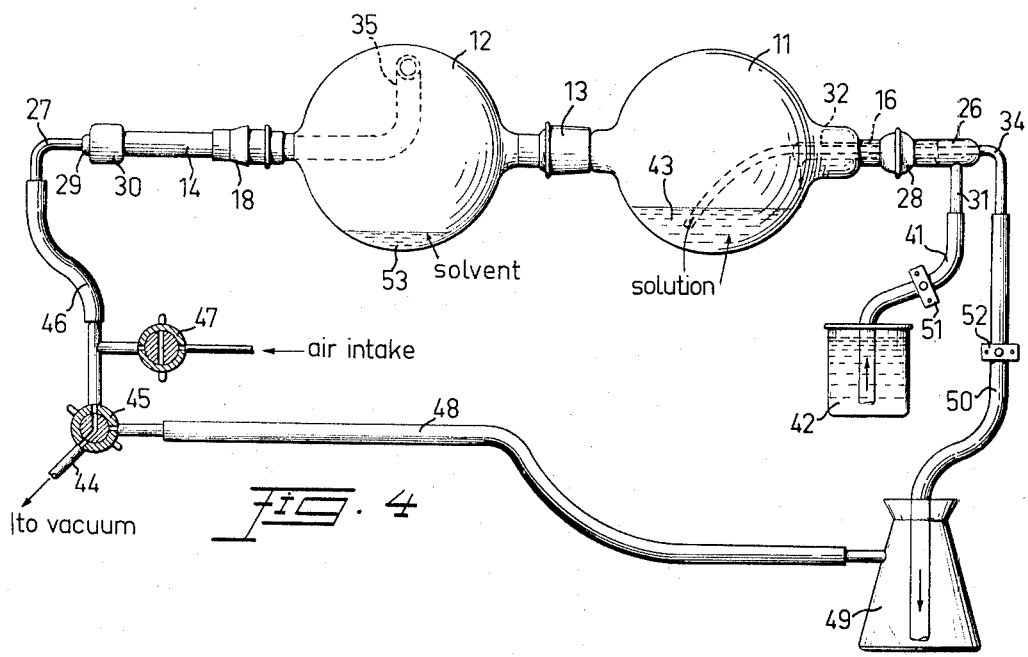
INVENTOR:
JOSEPH BUCHLER
BY
Karl F. Ross
AGENT

United States Patent Office 2,865,445
Patented Dec. 23, 1958

2,865,445

EVAPORATOR

Joseph Buchler, Fort Lee, N. J.

Application October 14, 1954, Serial No. 462,163

7 Claims. (Cl. 159—23)

My present invention relates to devices for evaporating solvents from solutions for the purpose of increasing their concentration to a desired degree.

An important object of this invention is to provide an evaporator having means for accelerating the volatilization of the solvent by greatly increasing the effective surface area of the subject liquid.

A related object of this invention is to provide a method of more efficiently increasing the concentration of a solution.

Another object of this invention is to provide an evaporator of the character set forth in which the environmental factors relevant to this operation, such as temperature and pressure, can be conveniently and accurately controlled.

A further object of this invention is to provide an evaporator as outlined above having simple means for introducing the subject liquid into a treatment vessel and withdrawing the liquid and the extracted solvent from such vessel after evaporation.

Still another object of this invention is to provide a new type of fluid-tight joint especially adapted for relatively rotating conduits as used in an apparatus according to the invention.

A feature of my invention resides in the provision of a rotating evaporator flask in which the subject liquid can be heated by suitable means, such as a hot water bath, the rotation of the flask resulting in the constant overturning of the body of liquid, whereby the effective surface of the liquid body is considerably increased and evaporation is accelerated.

Another feature of my invention resides in the provision of a condenser flask equipped with a rotating scoop which periodically dips into a pool of solvent withdrawn from the evaporator flask, whereby the excess solvent may be removed by suitable means such as, for example, a source of vacuum connected to the scoop. In order to simplify the construction of the apparatus, the two flasks are preferably interconnected for simultaneous rotation; the source of vacuum may also serve as a means for drawing the subject liquid into the evaporator flask, for facilitating the passage of solvent from the latter into the condenser flask, and for removing the concentrated solution.

The invention will be more fully described with reference to the accompanying drawing in which:

Fig. 1 shows, in side elevation, an embodiment of an evaporator according to the invention;

Fig. 2 shows, in side elevation and partly in section, an enlarged view of part of the condenser flask and associated elements;

Fig. 3 shows, also on a larger scale, a sectional view of the evaporator flask and associated elements; and Fig. 4 is a somewhat diagrammatic view of the apparatus of Figs. 1–3 as part of a system having means for introducing and withdrawing the solution to be treated.

The apparatus 10, Fig. 1, comprises an evaporator flask 11 detachably coupled to a condenser flask 12 by means of a simple glass joint 13. The unit 11, 12 is rotatable about its horizontal axis, for which purpose the condenser flask 12 is linked to a hollow drive shaft 14, journaled in a bearing 15, whereas a tubular extension 16 of evaporator flask 11 is supported on a pair of rollers 17 (only one shown). The linkage between flask 12 and shaft 14 includes a rubber sleeve 18 which flexibly joins the right-hand end of the shaft to a female coupling member 19 (Fig. 2) of frusto-conical shape, preferably of glass, which matingly receives a tubular extension 20 of flask 12. The supports 15, 17 for the rotating assembly 11, 12, 14 are mounted on a frame 21 which also supports a motor 22 for driving this assembly by way of a sheave 23, a belt 24 and a pulley 25 secured to shaft 14.

Held stationary on the frame 21 are an inlet tube 26 and an outlet tube 27. Tube 26 terminates in a glass flange 28 forming a socket for the ball-shaped extremity of glass tube 16. The joint formed between members 16 and 28 is well lubricated, in contradistinction to the glass joints 13 and 19, 20 which are greased only enough to facilitate their disassembly and which represent a frictional fit sufficient to insure the entrainment of both flasks 11, 12 by the shaft 14. Another anti-friction joint is formed by a ball-shaped head 29 at the end of tube 27, this head being received in a socket member 30 threadedly secured to shaft 14 as best seen in Fig. 2. Member 30 may consist of plastic material, preferably tetrafluoromethane polymer ("Teflon") which has been found to give a smooth yet airtight seal against glass; the highly passive surface of this material, which appears to the touch as though coated with a film of oil, enables its use without any sealing compound when applied against a smooth-surfaced object.

Inlet tube 26 is provided with an entrance port 31 and, to the left of it, with a tubular internal extension 32 projecting into the interior of flask 11. Extension 32, having a discharge opening 33 within flask 11, is concentrically traversed by a withdrawal tube 34 whose right-hand end projects beyond tube 26 and whose left-hand end opens into the flask 11 close to the lowest point, or nadir, of the latter. Extension 20, on the other side of the rotating assembly, forms a connection between outlet tube 27 and an elbow-shaped, tubular scoop 35 within flask 12 which is sealed to this flask and rotates with it; scoop 35 has its mouth close to the periphery of flask 12 at its median vertical plane, so as to alternate between the nadir and the zenith of this flask during rotation of the unit.

Flask 11 dips into a basin 36 containing a liquid, usually water, brought to a suitable temperature by an immersion heater 37. A source of cooling fluid, such as tap water, is connected to a faucet 38 above condenser flask 12 which in turn is positioned above a collector basin 39 having a drain 40.

The operation of my device will be described with particular reference to Fig. 4 in which the means for rotating, heating and cooling the flasks 11 and 12 have been omitted.

A conduit 41, extending from inlet port 31 of tube 26, dips into a vessel 42 containing the solution 42 to be treated. A source of vacuum (not shown) is connected to a conduit 44 which, in the illustrated position of a valve 45, communicates with a conduit 46 leading to the outlet tube 27. A valve 47, which is closed at the stage of operations about to be described, serves to connect conduit 46 with the atmosphere. A further conduit 48, which is functionless at this stage, extends from valve 45 to a receiving jar 49 provided with a lead-in conduit 50 joined to withdrawal tube 34. The amount of fluid passing through the two conduits 41 and 50 can be regulated by suitable control means, such as a pair of Hoffman clamps 51, 52.

When the vacuum is applied to conduit 44, air is exhausted from evaporator flask 11 by way of coupling 13, flask 12, scoop 35, shaft 14, outlet tube 27 and conduit 46; and the solution 43 is drawn from vessel 42 through conduit 41, port 31, inlet tube 26, extension 32 and opening 33 to form a pool within flask 11. When the desired level is reached, the flow of liquid from vessel 42 is cut off by the clamp 51. As the two flasks 11, 12 rotate, the continued application of a vacuum to tube 27 draws the solvent from the heated flask 11 into the cooled flask 12 where it condenses to form a pool 53. Scoop 35 dips periodically into this pool and the solvent is drawn out through conduit 44.

It has been found that the rate of evaporation will be approximately constant over a substantial range of concentrations. Thus clamp 51 may be adjusted for the continuous admission of liquid at the rate at which the solvent is extracted, whereby a more or less stable volume of solution of ever-increasing concentration is maintained in flask 11. When the desired concentration is reached (as readily determinable from a comparison of the amount of solution in flask 11 with the amount withdrawn from vessel 42), valve 47 is opened and the position of valve 45 is reversed to interconnect conduits 44 and 48. With clamp 52 sufficiently released, the vacuum applied to receiver 49 draws the concentrate 43 from flask 11 into this receiver by way of tube 34 and conduit 50. The operations described can then be repeated for the remainder of the liquid within vessel 42.

Although I have disclosed a single preferred embodiment of my invention, it is to be understood that the same may be realized in a number of modifications and adaptations without departing from the spirit and scope of the appended claims.

I claim:

1. An evaporator comprising a unit rotatable about a substantially horizontal axis, said unit including a first and a second flask, said first flask having a tubular extension in line with said axis, first conduit means opening into said first flask through said extension and forming stationary inlet means for admitting a solution into same, second conduit means forming a connection between said flasks along said axis, and third conduit means entering said second flask along said axis for removing condensed solvent from the latter, said third conduit means forming a scoop within said second flask passing periodically through a position adjacent the nadir of said second flask during rotation of said unit; means for heating said first flask and cooling said second flask; mechanism for rotating said unit about said axis; stationary outlet means for said solvent; a support for said first flask rigidly secured to said first conduit means; a first fluid-tight joint between said first conduit means and said extension enabling relative rotation therebetween; and a second fluid-tight joint between said outlet means and said third conduit means; at least one of said joints including a pair of mating members, one of said members having a surface of plastic material, the other of said members having a co-operating surface of glass.

2. An evaporator according to claim 1, wherein said members are in the shape of socket and ball, respectively.

3. An evaporator according to claim 1 wherein said plastic material is polymeric tetrafluoromethane.

4. An evaporator comprising a flask rotatable about an axis, mechanism for rotating said flask about said axis, said flask having a tubular extension in line with said axis, inlet means for admitting a solution into said flask, outlet means for removing volatile solvent from said flask, said inlet means including a stationary tubular formation projecting concentrically within said extension into said flask, a support for said flask rigidly secured to said inlet means, a fluid-tight joint between said inlet means and said extension enabling relative rotation therebetween, and a stationary discharge tube concentrically positioned within said formation for removal of a concentrated form of said solution from said flask.

5. An evaporator comprising a flask rotatable about an axis, mechanism for rotating said flask about said axis, said flask having a tubular extension in line with said axis, a stationary inlet tube and a stationary outlet tube respectively adapted for the admission and the withdrawal of a fluid into and from said flask, one of said tubes being spacedly nested inside the other one of said tubes and projecting into said flask within said extension, the outer one of said tubes forming a fluid-tight seal about the inner one of said tubes and being externally provided with a support for said flask, and a fluid-tight joint between said support and said extension enabling relative rotation therebetween.

6. An evaporator comprising a unit rotatable about a substantially horizontal axis, said unit including a first and a second flask, first conduit means opening into said first flask along said axis for admitting a solution into same, second conduit means forming a connection between said flasks along said axis, and third conduit means entering said second flask along said axis for removing condensed solvent from the latter, said third conduit means forming a scoop within said second flask passing periodically through a position adjacent the nadir of said second flask during rotation of said unit; means for heating said first flask and cooling said second flask; mechanism for rotating said unit about said axis, said mechanism including a hollow shaft forming part of said third conduit means; and a stationary withdrawal tube for said solvent connectable to a source of vacuum, said tube terminating in a spherical glass head, said shaft terminating in a socket of plastic material matingly surrounding said glass head.

7. An evaporator according to claim 6, wherein said plastic material is polymeric tetrafluoromethane.

References Cited in the file of this patent

UNITED STATES PATENTS

| 440,752 | Barotte | Nov. 18, 1890 |
| 980,444 | Sleeper | Jan. 3, 1911 |
| 1,116,196 | Zierden | Nov. 3, 1914 |
| 1,530,140 | Schneible | Mar. 17, 1925 |
| 1,597,809 | Lavett | Aug. 31, 1926 |
| 1,726,751 | Miles | Sept. 3, 1929 |
| 1,989,255 | Wood | Jan. 29, 1935 |
| 1,997,937 | Leaute | Apr. 16, 1935 |
| 2,156,628 | Hintze | May 2, 1939 |
| 2,475,834 | Harvey | July 12, 1949 |
| 2,551,360 | Bierwith | May 1, 1951 |
| 2,649,314 | Richardson | Aug. 18, 1953 |

OTHER REFERENCES

"Materials & Methods" (reprint), October 1954 issue, published by Reinhold Publishing Corp., New York, title "Teflon for Dry Bearings."

Bulletin "Teflon," published by Du Pont, received in Patent Office January 15, 1951, pp. 8, 9.